United States Patent
Sakdeo et al.

(10) Patent No.: US 10,318,197 B2
(45) Date of Patent: Jun. 11, 2019

(54) NATIVE STORAGE QUALITY OF SERVICE FOR VIRTUAL MACHINES

(71) Applicant: Tintri by DDN, Inc., Chatsworth, CA (US)

(72) Inventors: Sumedh V. Sakdeo, San Jose, CA (US); Edward K. Lee, Dublin, CA (US); Brandon W. Salmon, Menlo Park, CA (US)

(73) Assignee: Tintri by DDN, Inc., Chatsworth, CA (US)

( * ) Notice: Subject to any disclaimer, the term of this patent is extended or adjusted under 35 U.S.C. 154(b) by 0 days.

(21) Appl. No.: 15/092,345

(22) Filed: Apr. 6, 2016

(65) Prior Publication Data

US 2016/0299693 A1    Oct. 13, 2016

Related U.S. Application Data

(60) Provisional application No. 62/144,518, filed on Apr. 8, 2015.

(51) Int. Cl.
*G06F 12/00* (2006.01)
*G06F 3/06* (2006.01)
*G06F 9/455* (2018.01)
*G06F 11/34* (2006.01)

(52) U.S. Cl.
CPC ............ *G06F 3/0631* (2013.01); *G06F 3/061* (2013.01); *G06F 3/0604* (2013.01); *G06F 3/0605* (2013.01); *G06F 3/067* (2013.01); *G06F 3/0644* (2013.01); *G06F 3/0659* (2013.01); *G06F 3/0664* (2013.01); *G06F 3/0673* (2013.01); *G06F 9/45558* (2013.01); *G06F 11/3409* (2013.01); *G06F 11/3485* (2013.01); *G06F 12/00* (2013.01); *G06F 2009/45579* (2013.01); *G06F 2009/45583* (2013.01); *G06F 2201/815* (2013.01)

(58) Field of Classification Search
CPC ...................................................... G06F 12/00
USPC ........................................................ 711/147
See application file for complete search history.

(56) References Cited

U.S. PATENT DOCUMENTS 8,863,124 B1    10/2014   Aron
9,122,503 B1 *   9/2015   Hoff ..................... G06F 21/566
(Continued)

OTHER PUBLICATIONS

Kertesz et al. "Integrated Monitoring Approach for Seamless Service Provisioning in 1-20 Federated Clouds"; 20th Euromicro International Conference on Parallel, Distributed and Network-Based Processing [online]. Feb. 17, 2012 [retrieved May 30, 2016]. Retrieved from the Internet: <URL: http://www.pdp2012.org/presentations/Feb17/Feb17 Kertesz.pdf>; pp. 567-574.

*Primary Examiner* — Gautam Sain
(74) *Attorney, Agent, or Firm* — Van Pelt, Yi & James LLP

(57) ABSTRACT

Techniques to satisfy quality of service (QoS) requirements on a per virtual machine basis natively in a storage system are disclosed. In various embodiments, for each of a plurality of virtual machines a corresponding input/output (I/O) request queue is stored on the storage system. Requests are scheduled to be pulled from the respective request queues and added to a corresponding storage operation pipeline at the storage system in an order determined based at least in part on a per virtual machine quality of service parameter.

22 Claims, 14 Drawing Sheets

(56) References Cited

U.S. PATENT DOCUMENTS

| | | | |
|---|---|---|---|
| 2003/0172104 A1* | 9/2003 | Hooman | G06F 9/00 |
| | | | 709/103 |
| 2011/0292792 A1* | 12/2011 | Zuo | H04L 47/20 |
| | | | 370/230 |
| 2012/0084505 A1 | 4/2012 | Colgrove | |
| 2012/0311597 A1 | 12/2012 | Manula et al. | |
| 2013/0227558 A1* | 8/2013 | Du | G06F 9/45558 |
| | | | 718/1 |
| 2013/0262649 A1* | 10/2013 | Shimmitsu | H04L 41/5022 |
| | | | 709/223 |
| 2013/0326064 A1* | 12/2013 | Gulati | G06F 9/5061 |
| | | | 709/226 |
| 2014/0140213 A1 | 5/2014 | Raleigh | |
| 2014/0229941 A1 | 8/2014 | Bert | |
| 2015/0058487 A1* | 2/2015 | Karamanolis | G06F 12/0802 |
| | | | 709/226 |
| 2015/0121371 A1 | 4/2015 | Gummaraju | |
| 2015/0127858 A1* | 5/2015 | Sarkar | G06F 9/45558 |
| | | | 710/18 |
| 2016/0092259 A1* | 3/2016 | Mehta | G06F 9/45558 |
| | | | 718/1 |
| 2016/0216895 A1* | 7/2016 | Bhuyan | G06F 3/06 |
| | | | 711/103 |

* cited by examiner

| Proportional Scheduler | | | | | | |
|---|---|---|---|---|---|---|
| | shares | 10 | 80 | 20 | 60 | 40 |
| | workload | 8 | 256 | 16 | 64 | 32 |
| | work = shares/workload | 1.25 | 0.3125 | 1.25 | 0.9375 | 1.25 |
| | | 604 | | | | 608 |
| round 1 | VM | vm-1 | vm-2 | vm-3 | vm-4 | vm-5 |
| | vtime | 0 | 0 | 0 | 0 | 0 |
| round 2 | VM 606 | vm-1 | vm-2 | vm-3 610 | vm-4 | vm-5 |
| | vtime | 1.25 | 0.3125 | 1.25 | 0.9375 | 1.25 |
| round 3 | VM | vm-1 | vm-2 | vm-3 | vm-4 | vm-5 |
| | vtime | 1.25 | 0.625 | 1.25 | 0.9375 | 1.25 |
| round 4 | VM | vm-1 | vm-2 | vm-3 | vm-4 | vm-5 |
| | vtime | 1.25 | 0.9375 | 1.25 | 0.9375 | 1.25 |
| round 5 | VM | vm-1 | vm-2 | vm-3 | vm-4 | vm-5 |
| | vtime | 1.25 | 1.25 | 1.25 | 1.875 | 1.25 |
| round 6 | VM | vm-1 | vm-2 | vm-3 | vm-4 | vm-5 |
| | vtime | 2.5 | 1.5625 | 2.5 | 1.875 | 2.5 |
| round 7 | VM | vm-1 | vm-2 | vm-3 | vm-4 | vm-5 |
| | vtime | 2.5 | 1.875 | 2.5 | 1.875 | 2.5 |
| round 8 | VM | vm-1 | vm-2 | vm-3 | vm-4 | vm-5 |
| | vtime | 2.5 | 2.1875 | 2.5 | 2.8125 | 2.5 |
| round 9 | VM | vm-1 | vm-2 | vm-3 | vm-4 | vm-5 |
| | vtime | 2.5 | 2.5 | 2.5 | 2.8125 | 2.5 |
| round 10 | VM | vm-1 | vm-2 | vm-3 | vm-4 | vm-5 |
| | vtime | 3.75 | 2.8125 | 3.75 | 2.8125 | 3.75 |

NATIVE STORAGE QUALITY OF SERVICE FOR VIRTUAL MACHINES

CROSS REFERENCE TO OTHER APPLICATIONS

This application claims priority to U.S. Provisional Patent Application No. 62/144,518 entitled NATIVE STORAGE QUALITY OF SERVICE FOR VIRTUAL MACHINES WITH PER-VM CONTENTION VISUALIZATION AND AUTO ALLOCATION POLICIES filed Apr. 8, 2015 which is incorporated herein by reference for all purposes.

BACKGROUND OF THE INVENTION

Typically, storage systems are unaware of virtual machines (VMs). Instead, a typical system receives file system requests (e.g., create file, read, write, etc.) and performs such requests without any awareness of which requests are associated with which VM.

Storage quality of service (QoS) can be categorized into two main areas of study: 1) space sharing and 2) performance sharing. Two important use-cases of the performance sharing aspect "performance isolation" and "performance protection."

Performance isolation refers to isolating one storage system resource consumer's I/O traffic from another storage system resource consumer's I/O traffic. This may be important in virtualized environments because multiple VM users can run different kinds of applications and one VM user should not be affecting the I/O performance of other VM user. However, performance isolation on per-VM basis is not available natively with typical storage systems, since they are not aware natively of which I/O requests are associated with which VM's.

Performance protection refers to providing service levels in a storage environment where service-providers charge the end-user based on one or more predefined performance consumption metrics. Performance service levels on a storage system resource consumer may be assigned, for example, by setting a minimum and a maximum cap on performance metrics, like IOPS or throughput. A minimum cap on a resource consumer guarantees at least the specified performance service level for the resource consumer and a maximum cap on a resource consumer guarantees no more than the specified performance service level for the resource consumer. At times, service levels are used to solve the notorious noisy neighbor problem, where a resource consumer monopolizes the consumption of storage I/O resources and thus depriving other resource consumers of performance.

User expectations from guaranteed service levels are heavily dependent upon how much system resources are available. Every storage appliance has an upper limit on the performance that it can deliver. Hence, storage QoS should be able to inform the user if he/she has overprovisioned the storage system on performance.

Performance protection also gives rise to a set of complexities where some resource consumers have service levels set and some other do not have any service levels set. This can cause an imbalance between system performance resource allocations, which could lead to starvation.

Using the right performance metric may be critical in setting per-VM storage QoS policies of minimum and maximum. While IOPS is a widely used metric, IOPS does not gauge the performance measures correctly. This is because the I/O request sizes of VMs can differ and hence, throughput may be a more realistic performance gauge. However, users may be more familiar with IOPS as a measure of performance.

BRIEF DESCRIPTION OF THE DRAWINGS

Various embodiments of the invention are disclosed in the following detailed description and the accompanying drawings.

FIG. 6 is a diagram illustrating an example of a proportional scheduler as implemented in an embodiment of a virtual machine-aware storage system.

DETAILED DESCRIPTION

Figure 1:
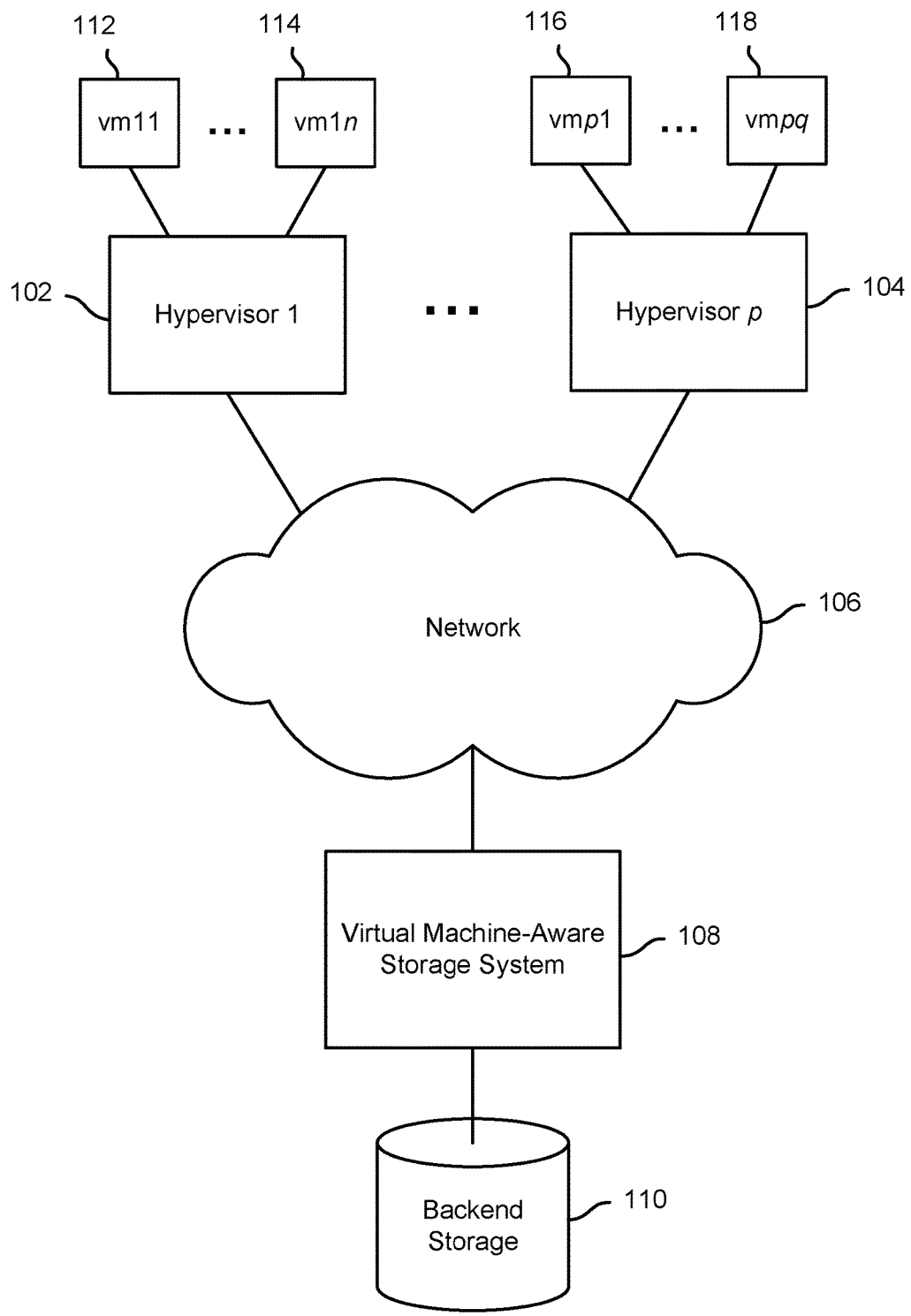
FIG. 1 is a block diagram illustrating an embodiment of a virtual machine-aware storage system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A VM-aware storage appliance or other storage system that natively provides quality of service (QoS) on a per-VM basis is disclosed. In various embodiments, separate VM-specific queues of read requests and write requests, received for example from one or more hypervisors, are maintained. Requests are mapped to a corresponding VM-specific queue. A scheduler causes requests from the respective queues to be admitted to a pipeline, in some embodiments separate read and write pipelines, as applicable, in an order that is determined based at least in part on the respective QoS parameters (e.g., minimum IOPS, maximum IOPS, etc.) associate with the respective queues and/or the respective VMs with which the queues are associated.

In various embodiments, a storage appliance that is tightly integrated with hypervisor environments such as VMware and Hyper-V, for example, is provided. Through the integration with hypervisor environments, the storage appliance's file system has information about the VMs residing on it. With this VM information, the file system can distinguish between I/Os generated by two different VMs. In various embodiments, this awareness of which I/Os are associated with which VMs forms the basis for providing Per-VM Storage Quality of Service (QoS).

FIG. 1 is a block diagram illustrating an embodiment of a virtual machine-aware storage system and environment. In the example shown, each of a plurality of hypervisors, represented in FIG. 1 by hypervisors 102 and 104, has access via network 106 to a virtual machine-aware storage system 108. Each hypervisor manages a plurality of virtual machines (VMs), e.g., VMs represented by VM 112 and VM 114 associated with hypervisor 102 and VMs represented by VM 116 and VM 118 associated with hypervisor 104. Virtual machine-aware storage system 108 stores virtual machine-related data in files stored on a back end storage 110. For example, each of the VMs represented in FIG. 1 by VMs 112, 114, 116, and 118 may have an associated file stored on virtual machine-aware storage system 108. Back end storage 110 may comprise one or more of flash storage (e.g., SSD), hard disk drives, and/or a hybrid/tiered storage that includes flash and hard disk drive storage.

In various embodiments, virtual machine-aware storage system 108 runs an operating system optimized to provide virtual machine-aware storage. In various embodiments, virtual machine-aware storage system 108 is highly integrated with hypervisors, such as hypervisors 102 and 104. Virtual machine-aware storage system 108 uses information obtained, directly and/or indirectly, from hypervisors, such as hypervisors 102 and 104, to track which files stored on virtual machine-aware storage system 108 are associated with which virtual machine(s). In some embodiments, virtual machine-aware storage system 108 may query a hypervisor that recently created a new file to determine a virtual machine, if any, with which the newly-created file is associated. In some embodiments, virtual machine-aware storage system 108 may extract virtual machine identifier information from file creation and/or associated requests and/or communications received from a hypervisor in connection with creating a new file. For example, based on an awareness of a hypervisor type with which a requesting hypervisor is associated, virtual machine-aware storage system 108 may extract from communications sent by the hypervisor and/or request from the hypervisor, in a manner determined at least in part based on the hypervisor type, information associating a virtual machine identity with the file.

In various embodiments, this awareness of which files are associated with which virtual machine(s) may be used to provide storage system quality of service on a per-VM basis, natively to a storage system, such as virtual machine-aware storage system 108, e.g., as described more fully below.

Figure 2:
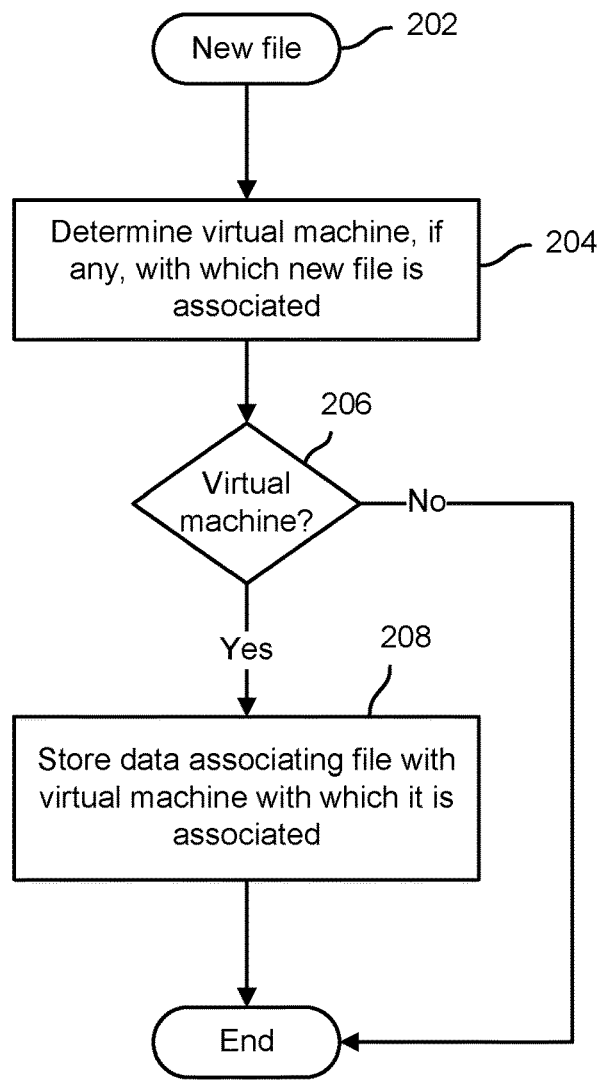
FIG. 2 is a flow chart illustrating an embodiment of a process to track which files are associated with which virtual machines.

FIG. 2 is a flow chart illustrating an embodiment of a process to track which files are associated with which virtual machines. In various embodiments, the process of FIG. 2 may be implemented by a virtual machine-aware storage system, such as virtual machine-aware storage system 108 of FIG. 1. In various embodiments, a file system of the virtual machine-aware storage system may perform the process of FIG. 2. In the example shown, when a new file is create (202), a virtual machine, if any, the new file is associate is determined (204). In some embodiments, a hypervisor may indicate a virtual machine identifier with which a new file is associated. The indication may be received in connection with a request to create the file and/or via a subsequent communication. In some embodiments, the hypervisor may be queried, e.g., via an API of the hypervisor, to determine the virtual machine with which the file is associated. If the file is determined to be associated with a virtual machine (206), data associating the file with the virtual machine to which it corresponds is stored (208), e.g., in a table, index, database, or other data structure and/or repository. If the new file is not (or has not yet been determined to be) associated with a virtual machine (206), or once data associating the file with a corresponding virtual machine has been stored (208), the process ends.

In various embodiments, a virtual machine-aware storage system may be calibrated and/or tested to generate a model of storage system performance with respect to I/O requests of various sizes. The resulting model(s) may be used in various embodiments to provide QoS on a per-VM basis with respect to VMs that may have dissimilar characteristics, e.g., VMs that generate I/O requests at different sizes. For example, in some embodiments, virtual machines may be configured to make requests (e.g., read, write requests) in different sizes (e.g., 8 kB, 256 kB, etc.). Requests of a larger size typically will require more time to process, for example, than smaller-sized requests. In various embodiments, models are generated to model storage system performance across request size, to enable QoS to be provided on a per-VM basis across VMs that may be configured to use different request sizes.

Figure 3A:
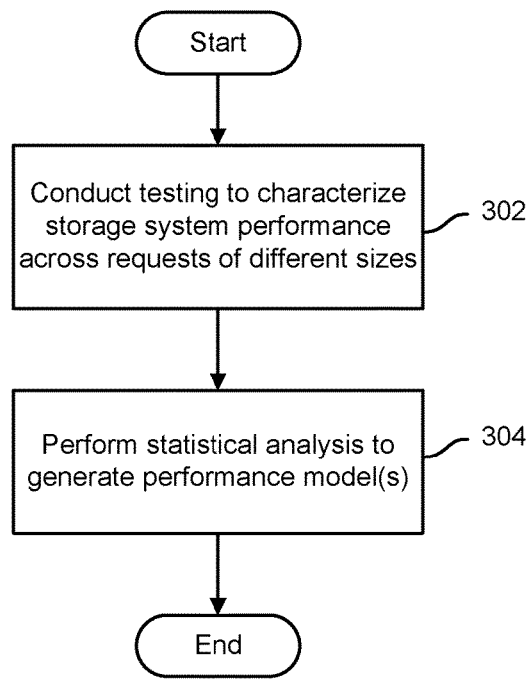
FIG. 3A is a flow chart illustrating an embodiment of a process to model storage system performance.

FIG. 3A is a flow chart illustrating an embodiment of a process to model storage system performance. In various embodiments, the process of FIG. 3A may be performed by and/or with respect to a virtual machine-aware storage system, such as virtual machine-aware storage system 108 of FIG. 1. In the example shown, testing is conducted to characterize storage system performance across requests of different sizes (e.g., 8 kB, 16 kB, 32 kB, 64 kB, 256 kB, etc.) (302). For example, for a given request size, increasing numbers of requests (IOPS) may be submitted, and the storage system latency (e.g., time to complete requests) at varying workloads may be observed. Statistical analysis is performed to generate one or more performance models (304). In some embodiments, separate models may be generated for read performance and write performance, respectively. In various embodiments, the models may be used to design and manage per-VM queues and an associated pipeline to perform IOPS, e.g., one set of queues and associated pipeline to perform read operations and another to perform write operations. In some embodiments, the model(s) may be used by the storage system to determine whether to admit a next request from a VM-specific queue to an associated I/O pipeline (e.g., read, write pipeline). For example, a pipeline may be sized in accordance with an understanding of a maximum workload that the storage system can handle at a given time, in some embodiments expressed as a total "cost" and/or in terms of throughout (e.g., kilobytes). If the work currently in the pipeline is less than the total capacity and if based on the applicable model(s) the incremental "cost" of adding a next request (e.g., from a queue next in line to have a request admitted to the pipeline) would not result in the total system capacity (e.g., pipeline size) being exceeded, the request may be admitted.

Figure 3B:
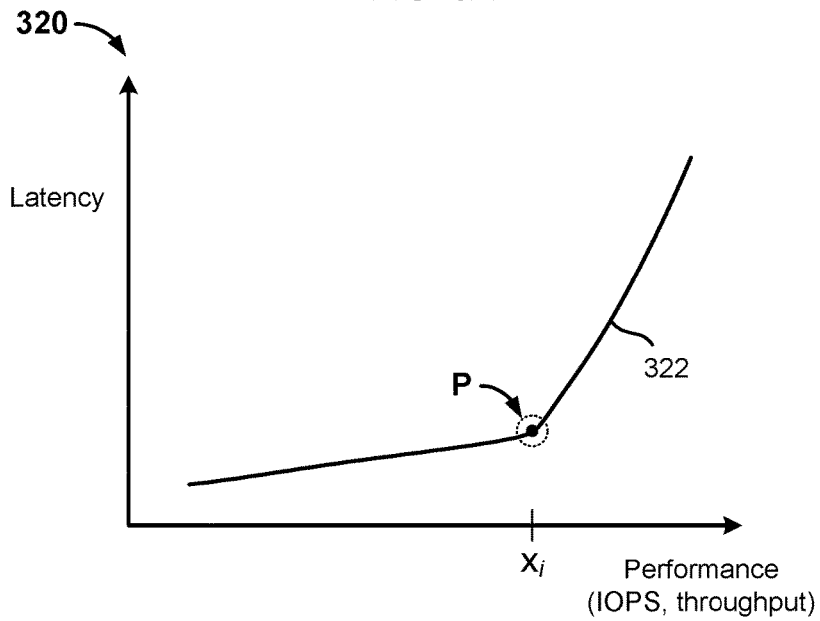
FIG. 3B is a diagram illustrating an example of a graph of storage system performance in an embodiment of a virtual machine-aware system.

FIG. 3B is a diagram illustrating an example of a graph of storage system performance in an embodiment of a virtual machine-aware system. In the example shown, in graph 320 latency is plotted against increasing workload ("performance") such as number of IOPS of a given request size or data throughput based on requests of a given size (e.g., 8 kB). The curve 322 shows the results observed in this example. At point "P" corresponding to a workload "Xi" one can see the latency begins to increase much more rapidly with increasing workload as the number of requests (and/or throughput associated with increasing requests of the given size) increases, as compared to workload lighter than Xi.

Figure 3C:
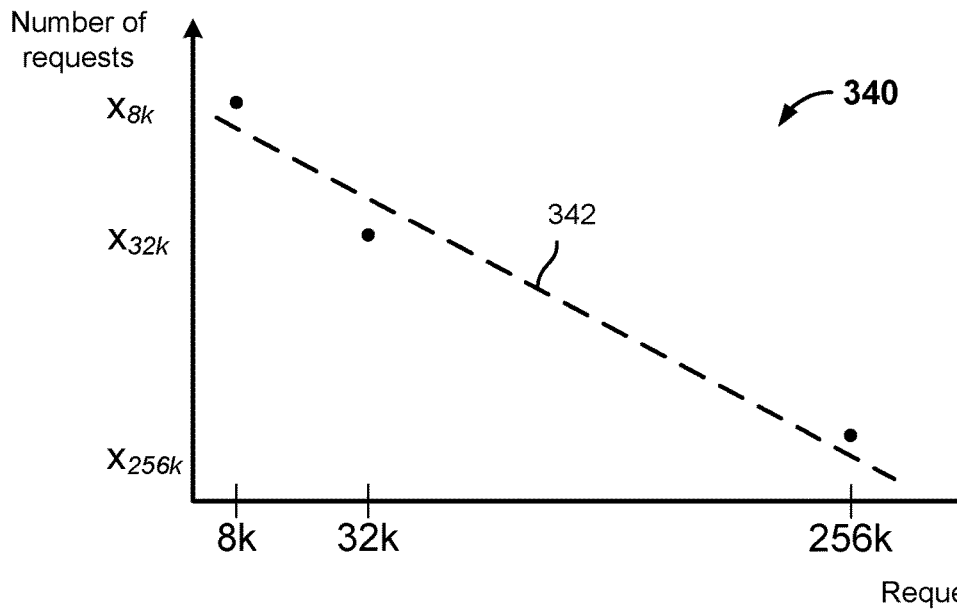
FIG. 3C is a diagram illustrating an example of a graph of storage system performance in an embodiment of a virtual machine-aware system.

FIG. 3C is a diagram illustrating an example of a graph of storage system performance in an embodiment of a virtual machine-aware system. In the example shown, the respective inflection points Xi associated with different sizes of request are plotted in graph 340, and a statistical processing (e.g., linear regression analysis) is performed to determine a line 342 that characterizes system capacity across requests of varying size, in terms of number of requests of a given size that can be processed at saturation before latency spikes without increased throughput.

In various embodiments, analysis such as described above in connection with FIGS. 3A-3C may be performed to characterize a storage system and model its ability to handle various workloads. In some embodiments, calculations may be performed to distinguish between a first component of the observed "cost" of performing a request that is independent of request size and a second component that is attributable to the size of the request. For example, if the storage system has been characterized for requests of two different sizes, say 8 kB requests and 256 kB requests, then an equivalence may be set up between the number of requests above which latency spiked at each respective size as follows:

$$x_{8\ k}(8\ k+cost)=x_{256\ k}(256\ k+cost)$$

In some embodiments, $X_{8\ k}$ and $X_{256\ k}$ are determined by testing, and the above equation is solved to determine a size-independent cost component (e.g., "cost" in the above equation), expressed in kilobytes (kB). For example, if during a performance test in which the storage system is saturated with request it is found that 64 requests at 8 kB request size or 4 requests at 256 KB were sufficient, i.e. they could be processed before latency spiked without an increase in the throughput, the computed request-size-independent cost component would be 8.5 kB. In some embodiments, the cost of adding a next request to the pipeline might be considered to be the request size plus the size-independent cost, in this example 8.5 kB. For example, a next 8 kB request may be added only if at least 16.5 kB worth of pipeline were available, while a next 256 kB request may be added only if there were at least 264.5 kB of capacity (space) available in the pipeline.

Figure 4:
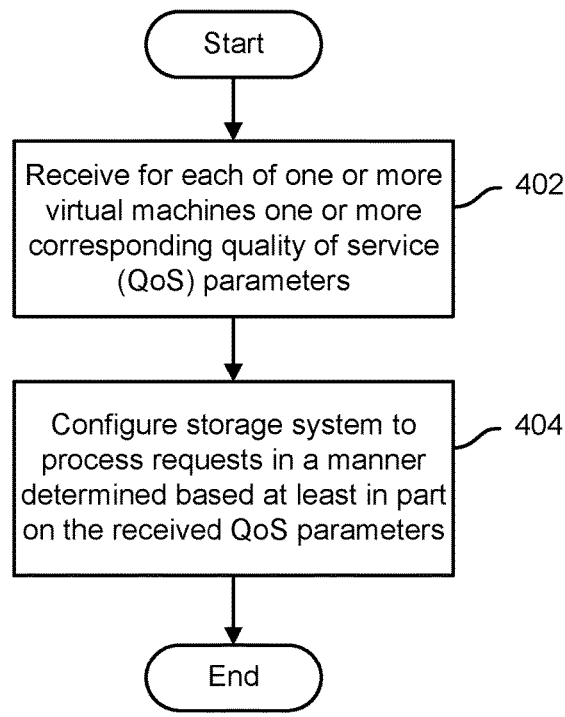
FIG. 4 is a flow chart illustrating an embodiment of a process to implement a QoS parameter on a per-virtual machine basis.

FIG. 4 is a flow chart illustrating an embodiment of a process to implement a QoS parameter on a per-virtual machine basis. In various embodiments, the process of FIG. 4 may be implemented by a virtual machine-aware storage system, such as storage system 108 of FIG. 1. In the example shown, quality of service (QoS) parameter data is received for each of one or more virtual machines (402). In various embodiments, QoS parameters may be received via an administrative user interface; an API, web services call, or other programmatic interface; a configuration file; etc. In various embodiments, all or fewer than all files stored on a storage system may be associated with a QoS parameter. For example, certain files may be associated with virtual machines each of which has been assigned a minimum IOPS QoS parameter value, while other files may be associated with virtual machines for which no minimum IOPS commitment has been configured and/or files not (yet) associated with any virtual machine.

Referring further to FIG. 4, the storage system is configured to process requests in a manner that is determined based at least in part on the received QoS parameters (404). In various embodiments, virtual machine-specific queues are used to service requests associated with files associated with virtual machines, and requests are pulled from the respective queues for servicing based at least in part on the respective QoS parameter values, if any, associated with the respective virtual machines and/or their respective corresponding queues.

Figure 5:
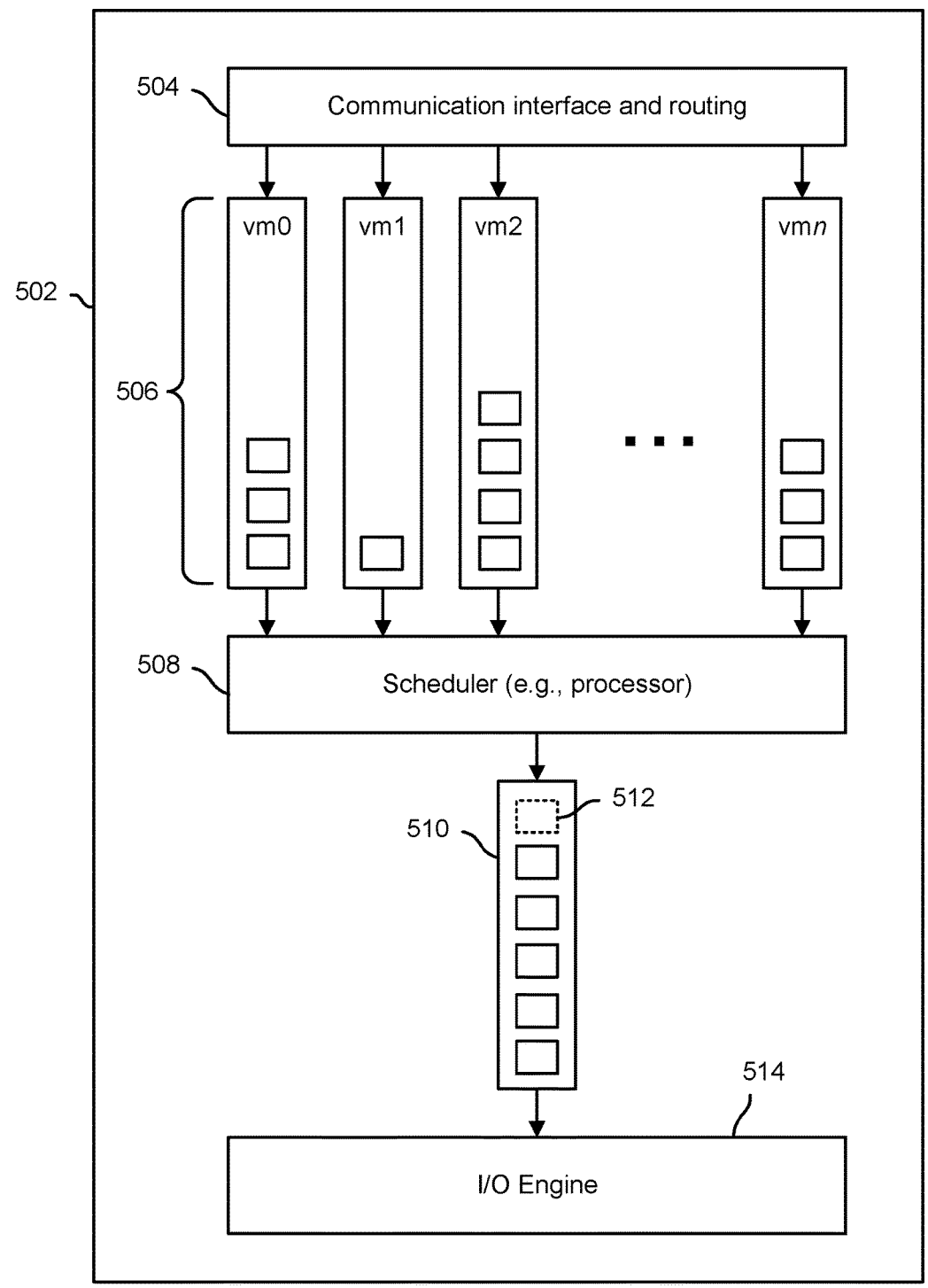
FIG. 5 is a block diagram illustrating an embodiment of a virtual machine-aware storage system with per-VM I/O queues.

FIG. 5 is a block diagram illustrating an embodiment of a virtual machine-aware storage system with per-VM I/O queues. In various embodiments, the elements shown in FIG. 5 may be included in a virtual machine-aware storage system, such as storage system 108 of FIG. 1. In the example shown, storage system 502 includes a communication interface 504 configured to receive requests (e.g., file creation/deletion, read, write) from a set of one or more hypervisors. Communication interface 504 may include one or both of a network interface (e.g., a network interface card) and logic to determine for each received request a virtual machine with which the request is associated and to place the request in a next available position (if any) in the corresponding virtual machine-specific queue 506. In various embodiments, the virtual machine with which a request is associated may be determined based at least in part on a file with which the request is associated and previously stored data associating that file with a corresponding virtual machine. Requests place in respective ones of a plurality of virtual machine-specific queues 506 are scheduled by a proportional scheduler 508 to be added to a pipeline 510 of requests to be processed. For example, a next available location 512 in pipeline 510 may be filled by pulling a next-scheduled request from among the queues 506 and adding it to the pipeline 510 in position 512. An I/O engine 514 pulls requests from the pipeline 510 and services each request in turn, e.g., by reading data from an associated file and/or writing data to an associated file. In some embodiments, read performance and write performance of the storage system are modeled separately, and separate queue and/or pipeline structures may be used to manage and process read request and write requests, respectively.

FIG. 6 is a diagram illustrating an example of a proportional scheduler as implemented in an embodiment of a virtual machine-aware storage system. In various embodiments, the schedule shown in FIG. 6 may be an example of a schedule produced by a proportional scheduler, such as scheduler 508 of FIG. 5. In the example shown, schedule 602 includes for each of five virtual machines, in columns labeled "vm-1" through "vm-5", for each of 10 scheduling rounds, a corresponding "virtual time" at which a next request from a virtual machine-specific queue associated with that virtual machine will be added to a pipeline (e.g., read request pipeline, write request pipeline, etc.) with which the schedule 602 is associated. In the example shown, storage system resources have been allocated among the five VMs as indicated by the respective number of "shares" (see first populated row) ascribed to each, i.e., 10, 80, 20, 60, and 40 shares, respectively. A respective request size (row marked "workload") associated with each VM is shown, specifically, 8 kB, 256 kB, 16 kB, 64 kB, and 32 kB, respectively. A computed "work" value for each VM, defined in this example as the number of shares ascribed to the VM divided by the request size, is computed as shown. For example, the work values for VMs vm-1 and vm-2 are 1.25 and 0.3125, respectively, as shown in the box labeled 604. Since each request associated with vm-1 is considered to require four times the work of a request from vm-2 (1.25=4×0.3125), the scheduler has scheduled only one request from vm-1 to be scheduled to be added to the pipeline for every four requests added from vm-2, as indicated by the brackets labeled 606. Similarly, since the work associated with servicing a request from vm-4 has been computed to be three times that of a request from vm-2, as indicated by the dashed double arrow labeled 608, three requests from vm-2 have been scheduled for every one request from vm-4, as indicated by the dashed pairs of brackets labeled 610. In this way, the schedule 602 ensures fair access to storage system resources, allocated in proportion to the workload (e.g., request size) adjusted to reflect, in this example, unequally allocated "shares" of storage system resources.

In various embodiments, the shares allocated to each respective VM may be determined, in some embodiments programmatically, based at least in part on QoS guarantees (e.g., minimum IOPS) and/or limits (e.g., maximum IOPS) associated with each respective VM and/or QoS (or other) category with which each respective VM is associated. In some embodiments, shares may be allocated manually, e.g., via an administrative or other user interface.

Figure 7:
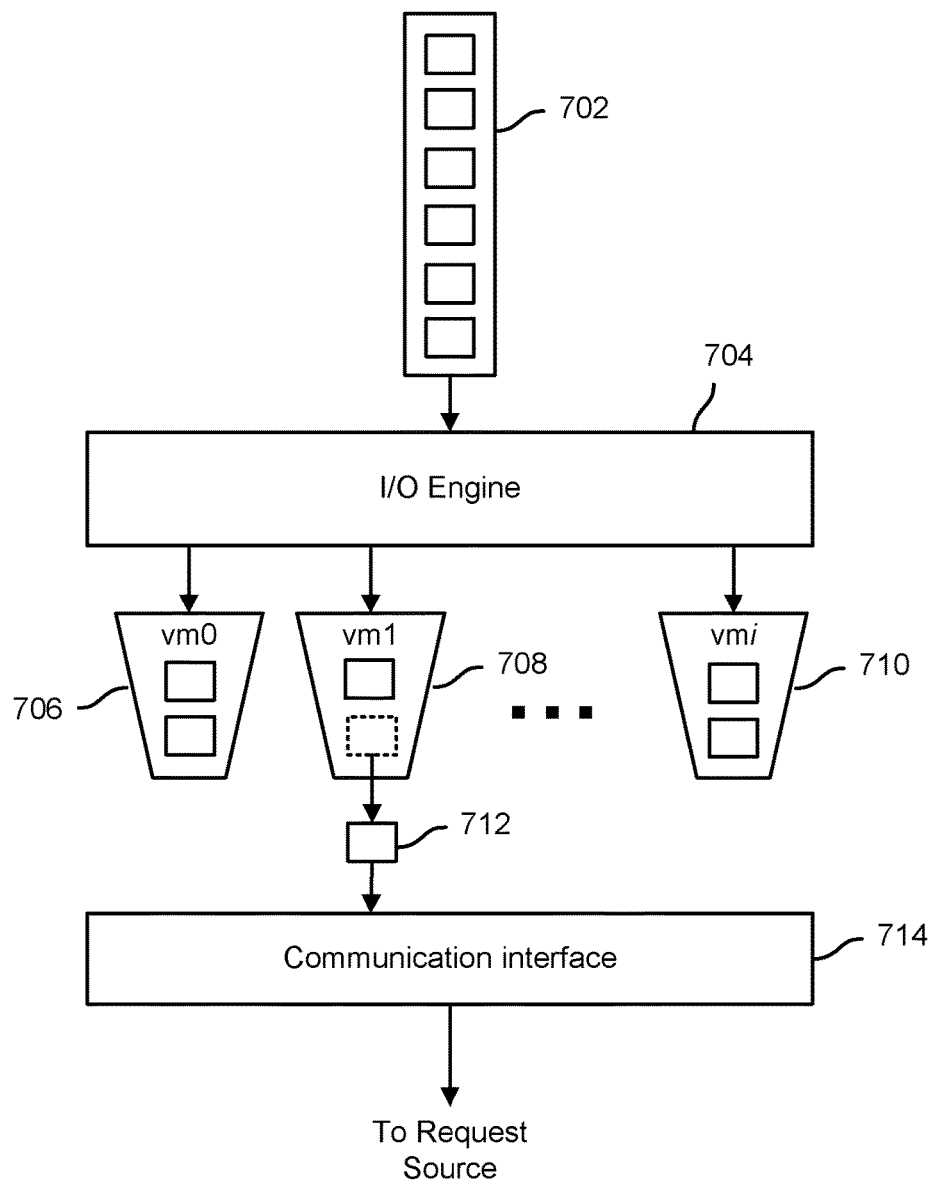
FIG. 7 is a block diagram illustrating an embodiment of a virtual machine-aware storage system configured to enforce a maximum IOPS QoS parameter.

FIG. 7 is a block diagram illustrating an embodiment of a virtual machine-aware storage system configured to enforce a maximum IOPS QoS parameter. In various embodiments, the components and associated techniques illustrated in FIG. 7 may be incorporated into a virtual machine-aware storage system, such as storage system 108 of FIG. 1. In the example shown, requests in a pipeline 702 are serviced by an I/O engine 704. As each request is serviced, if the request is associated with a virtual machine that has a maximum IOPS QoS parameter associated with it, a request acknowledgement is generated but not sent until a subsequent time determined at least in part using a leaky bucket type data structure, such as virtual machine-specific leaky buckets 706, 708, and 710 in the example shown. Each leaky bucket (706, 708, 710) emits acknowledgements at a rate associated with a maximum IOPS parameter associated with the virtual machine with which that leaky bucket is associated. In some embodiments, there is a provision for VM I/Os to burst above the maximum IOPS for a bounded amount of time and is proportional to the amount of burst cycles generated by that VM. Throttling acknowledgements in this manner results in (at least well-behaved) request senders (e.g., hypervisors and/or threads associated with specific VMs) regulating the sending of new requests to the storage system, effectively enforcing a maximum IOPS for the VM. In the example shown, an acknowledgement 712 emitted by leaky bucket 708 may be sent via communication 714 to the node (e.g., hypervisor) that sent the request with which the acknowledgement 712 is associated. Other acknowledgements not yet emitted from leaky buckets 706, 708, and 710, will not be sent, even though the associated requests have been completed, until such later times at which those acknowledgements may be emitted, each from its respective leaky bucket.

In some embodiments, requests will spend time waiting in VM queues as shown in FIG. 5, 506, such latency attributed by VM's I/O request determines the measure of contention experienced by this VM for storage resources (sometimes referred to herein as "contention latency").

In some embodiments, requests from a VM are throttled before acknowledgements are sent to client source as shown in FIG. 7, which enables latency associated with such throttling, e.g., to enforce a maximum IOPS QoS parameter (sometimes referred to herein as "throttle latency"), to be distinguish from (and/or reported and/or represented in visualizations separately from) latency associated with waiting in a queue and/or pipeline to be performed (sometimes referred to herein as "contention latency").

Figure 8:
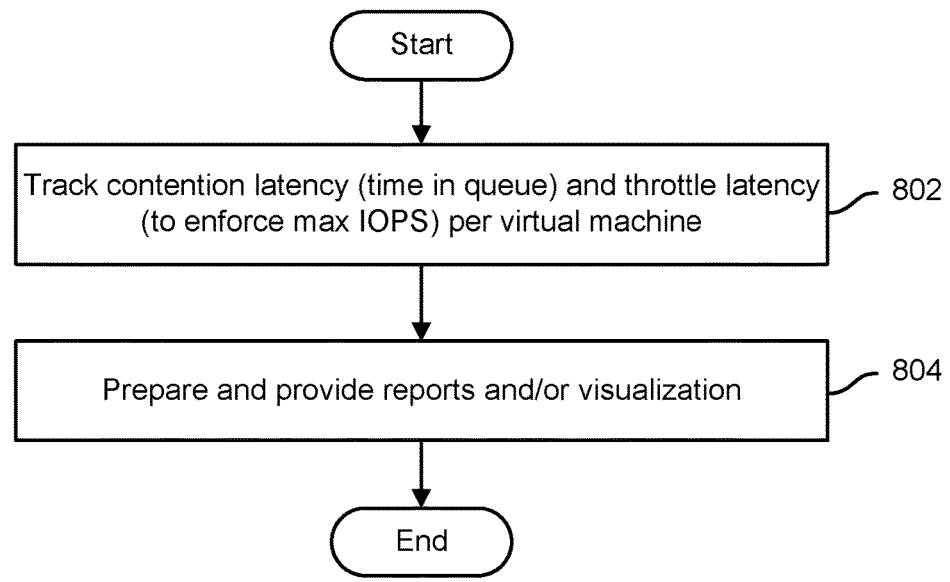
FIG. 8 is a flow chart illustrating an embodiment of a process to provide a visualization of storage system performance on a per-VM basis.

FIG. 8 is a flow chart illustrating an embodiment of a process to provide a visualization of storage system performance on a per-VM basis. In various embodiments, the process of FIG. 8 may be implemented by an analytics and/or reporting module of a virtual machine-aware storage system, such as storage system 108 of FIG. 1. If the example shown, contention latency (e.g., one or more of time in queue, time in pipeline, and actual processing time) and throttle latency (e.g., to enforce maximum IOPS, as in FIG. 7) separately on a per-VM basis (802). For example, for a given VM, the time each request was added to a VM-specific queue associated with that VM may be compared with a time at which the corresponding acknowledgement was generated to compute a content time for the request, and the time at which the acknowledgement was generate may be compared to the time at which the acknowledgement was sent may be compared to compute a throttle latency (if any). Such statistics may be computed, aggregated, accumulated, etc. on a per-VM basis. Reports and/or visualizations may be generated and provide to report contention latency, throttle latency, or both on a per-VM basis (804).

Figure 9:
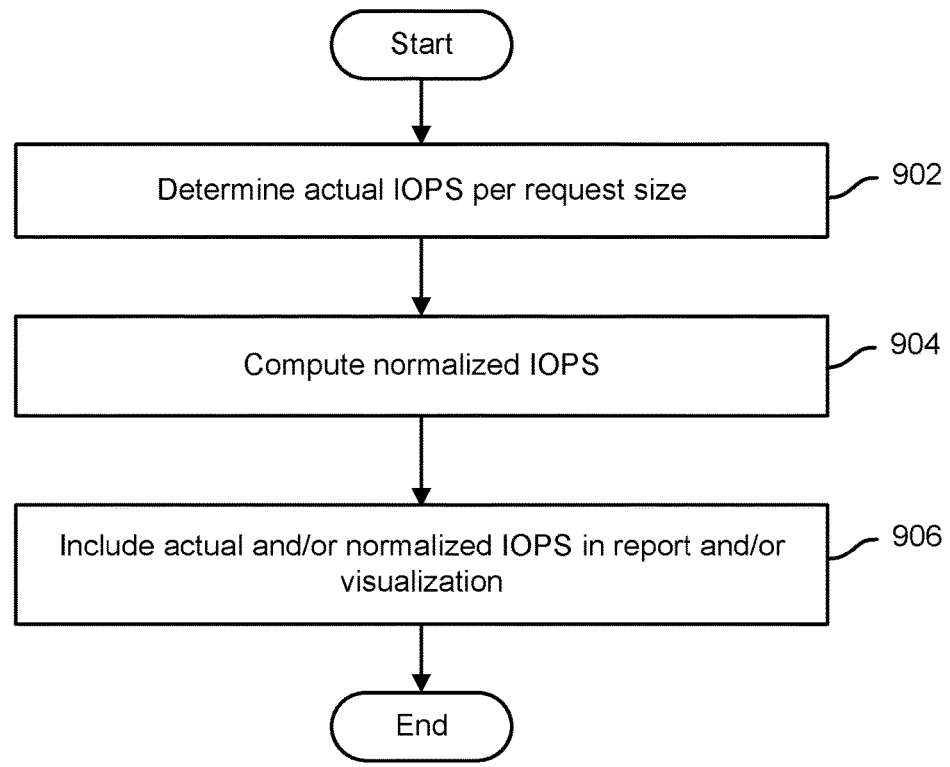
FIG. 9 is a flow chart illustrating an embodiment of a process to report normalized storage system performance on a per-VM basis.

FIG. 9 is a flow chart illustrating an embodiment of a process to report normalized storage system performance on a per-VM basis. As described herein, different VMs and/or hypervisors may be configured to submit read and/or write requests of different sizes (e.g., 8 kB, 256 kB, etc.) As a result, the most familiar traditional measure of storage system performance, "IOPS" or "I/O operations per second", may not fully and accurately reflect the performance achieve across workloads of varying size. In various embodiments, therefore, a "normalized IOPS" may be computed and reported, in addition to and/or instead of IOPS or other performance measures, such as throughput (e.g., how many bytes have been read and/or written in a given period). In some embodiments, performance of a storage system with respect to requests other than a reference size, such as 8 kB, may be normalized to be more directly comparable to performance with respect to workloads of the reference request size. For example, completing an I/O operation with respect to a request of size 8 kB may be considered 1 normalized IOP while a single iteration of the same operation with respect to a request of size 256 kB may be counted as 32 normalized IOPS, since the request size was 32 times as large.

Referring further to FIG. 9, in the example shown, for each request size the actual number of I/O operations per second (actual IOPS) is determined (902). The respective actual IOPS numbers are used to compute corresponding normalized IOPS, e.g., on a per-VM basis (904). One or both of the actual IOPS and the computed normalized IOPS are include in a report and/or visualization (906).

Figure 10:
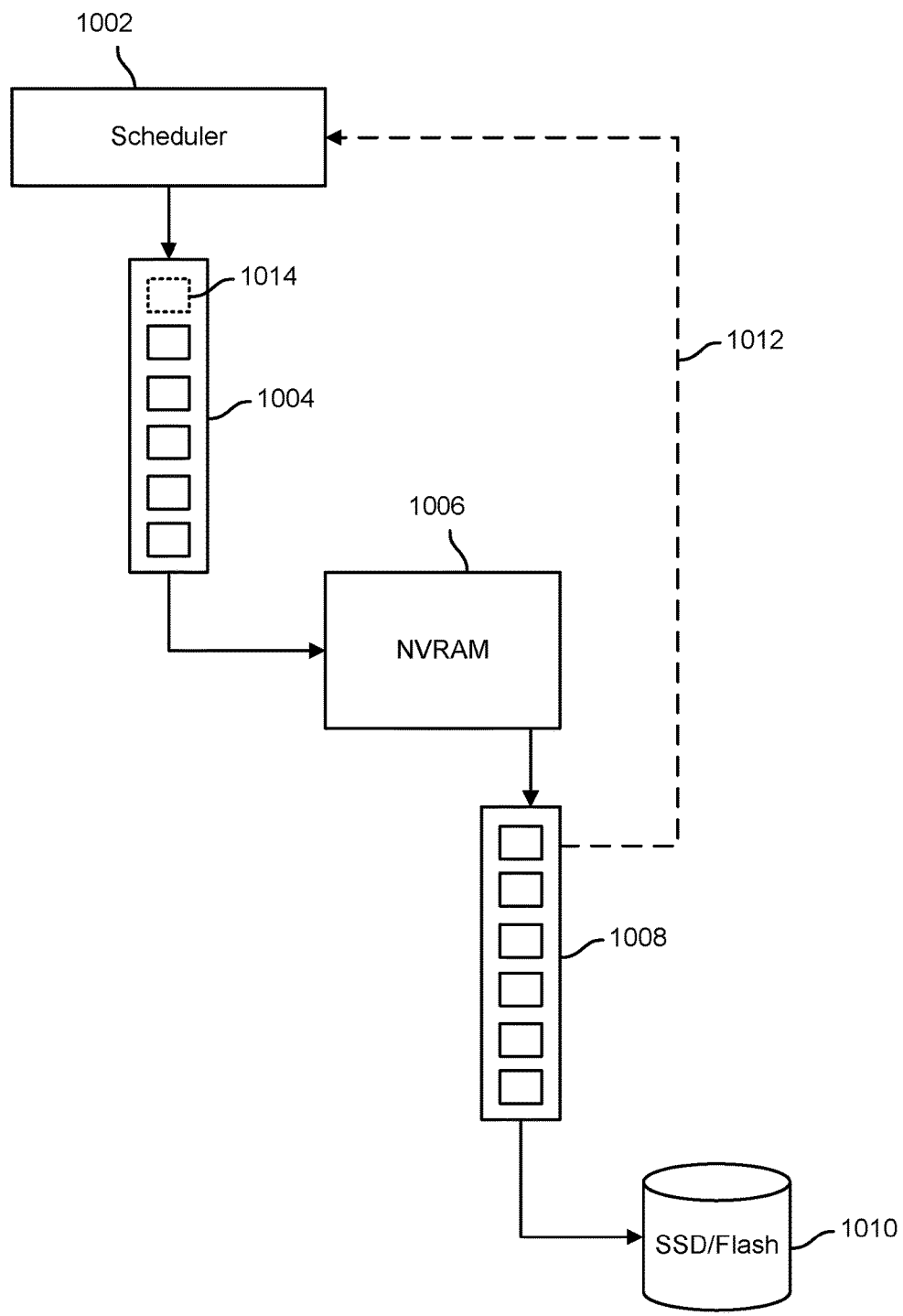
FIG. 10 is a block diagram illustrating an embodiment of a virtual machine-aware storage system configured to regulate admittance to a frontend write queue based on backend write queue state.

FIG. 10 is a block diagram illustrating an embodiment of a virtual machine-aware storage system configured to regulate admittance to a frontend write queue based on backend write queue state. In various embodiments, a virtual machine-aware storage system may process write requests by first storing in a non-volatile memory, in a frontend write process, data that is requested to be written to a file, and separately, in a backend write process, writing more permanently to a solid state drive (SSD)/Flash storage the data written initially to non-volatile memory. In various embodiments, a backend queue/pipeline depth is monitored and taken into consideration in determine whether to admit a next write request to a frontend pipeline.

In the example shown in FIG. 10, for example, scheduler 1002 is configured to schedule requests to be pulled from VM-specific queues (not shown in FIG. 10) and added to a frontend write request pipeline 1004. An I/O engine (not shown in FIG. 10) services requests in pipeline 1004 by storing in NVRAM 1006 data requested to be written in each respective request. A backend pipeline 1008 is used to manage a backend process of reading from NVRAM 1006 and writing more permanently to SSD/Flash 1010 data written initially to NVRAM 1006. In the example shown, a backend pipeline state feedback 1012 is provided to scheduler 1002 to be taken into account by scheduler 1002 in determining whether to admit a next write request to an available location 1014 in frontend pipeline 1004. In some embodiments, if the backend pipeline 1008 is full, as in the example shown, scheduler 1002 may wait to admit a next write request to frontend pipeline 1004, even if there is sufficient available space (e.g., 1014) in the frontend pipeline to receive a next write request.

Figure 11:
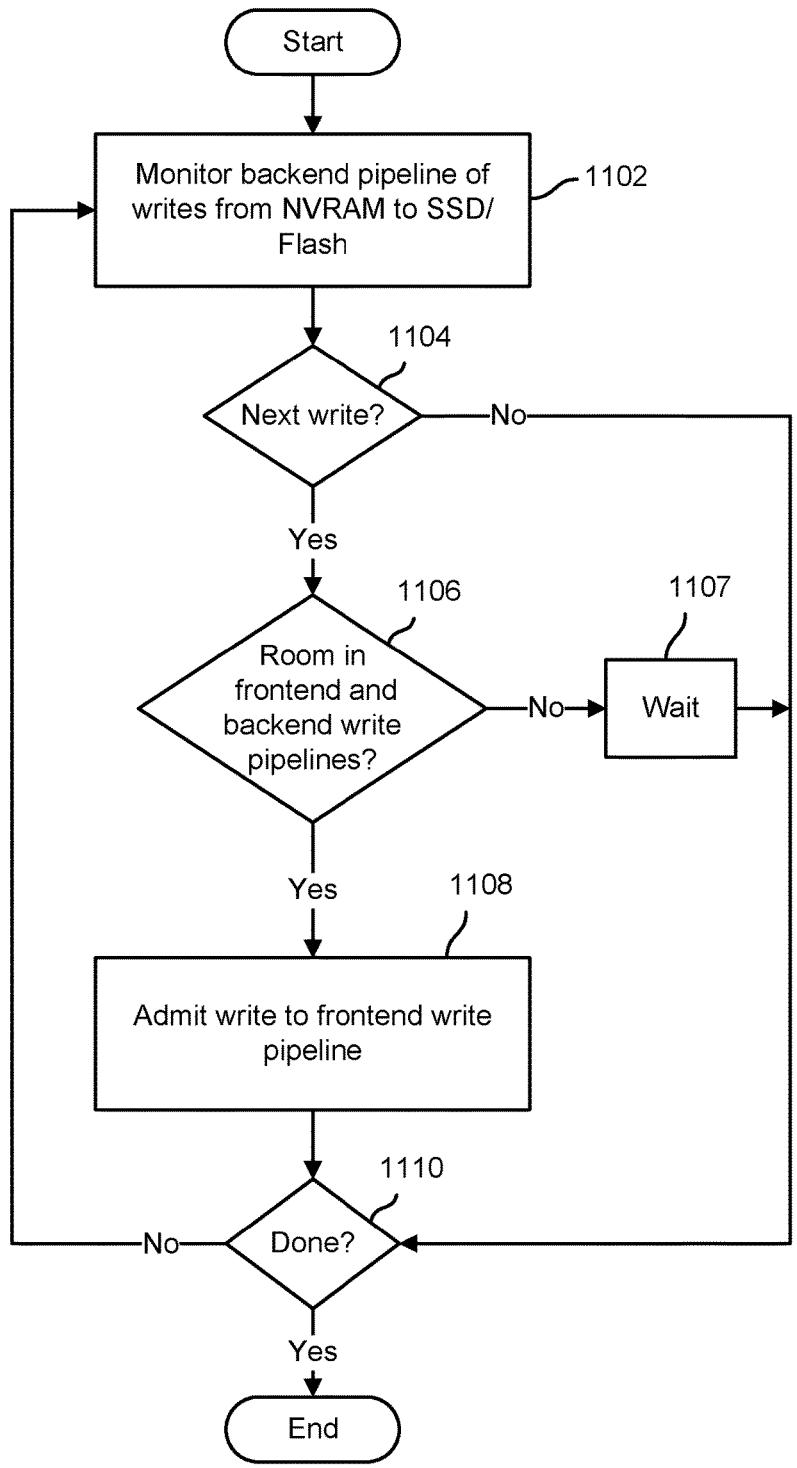
FIG. 11 is a flow chart illustrating an embodiment of a process to regulate admittance to a frontend write queue based on backend write queue state.

FIG. 11 is a flow chart illustrating an embodiment of a process to regulate admittance to a frontend write queue based on backend write queue state. In various embodiments, the process of FIG. 11 may be implemented by a scheduler, such as scheduler 1002 of FIG. 10. In the example shown, a backend pipeline of writes from NVRAM (or other frontend storage) to SSD/Flash (or other backend storage) is monitored (1102). If a next write request is ready to be added to a frontend pipeline, to be written to NVRAM (1104) (for example, a next-scheduled queue has a write request waiting, it is determined whether there is room currently in both the frontend write pipeline and the backend write pipeline (1106). If not (1106), the process waits (1107) until there is room in both the frontend and backend write pipelines. If there is room in both the frontend and backend write pipelines (1106), the write request is admitted to the frontend pipeline (1108). The process continues until done (1110), e.g., the system is taken offline for maintenance.

In various embodiments, storage system resources may be allocated to different categories of consumer, for example based on whether consumers (e.g., VMs) have QoS parameters set, and if so which ones and the respective values of each. In addition, in some embodiments, some proportion of storage system resources may be allocated for internal file system use, such as garbage collection and other internal processes. In some embodiments, allocations and/or default allocations may be determined and/or configured at least in part programmatically, based on information available to the storage system, such as QoS parameters, as applicable, that have been associated with the respective VMs with which all or some of the files stored on the storage system are associated.

Figure 12:
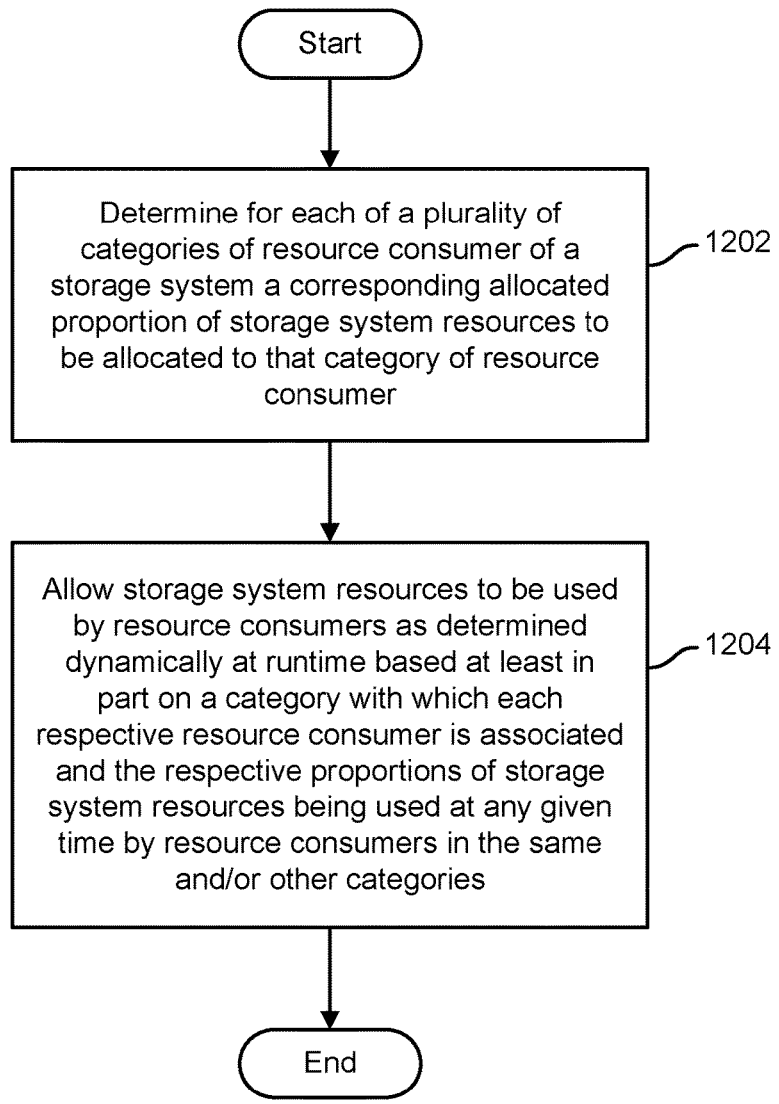
FIG. 12 is a flow chart illustrating an embodiment of a process to allow use of storage resources according to a programmatically determined allocation.

FIG. 12 is a flow chart illustrating an embodiment of a process to allow use of storage resources according to a programmatically determined allocation. In various embodiments, the process of FIG. 12 may be implemented by a virtual machine-aware storage system, such as storage system 108 of FIG. 1. In the example shown, for each of a plurality of categories of resource consumer of a storage system, a corresponding allocated proportion of storage system resources to be allocated to that category of resource consumer is determined (1202). Storage system resources are allowed to be used by resource consumers, as determined dynamically at runtime based at least in part on a category with which each respective resource consumer is associated and the respective proportions of storage system resources being used at any given time by resource consumers in the same and/or other categories (1204).

In various embodiments, storage resources may be allocated programmatically between external consumers, such as different categories of VM, and internal file system operations. In some embodiments, internal operations may be treated in the same way as VMs, in terms of storage system resource allocation, and such "internal" VMs may have resources allocated to them in the same or a similar way as actual VMs. Examples of such internal operations may include, without limitation:

Garbage Collection for Log Structured File System.
    Flash Eviction in Hybrid File System, to keep the hot data in flash and evict cold data to disk.
    Raid Rebuild, if a SSD or HDD drive fails.
    Read Caching in Hybrid File System, which involves moves the cold data that has been accessed from HDD into SSDs.
    Per-VM Replication for data protection.

In various embodiments, storage system resources may be allocated programmatically across different categories of VM, each category having a different set of one or more types of QoS parameter associated therewith. For example, in some embodiments, while configuring per-VM storage QoS, in terms of minimum and maximum normalized IOPS a user has the flexibility to choose from one or more of the below configurations:

Set both minimum and maximum IOPS for a VM.
Set only minimum and no maximum IOPS for a VM.
Set no minimum and only maximum IOPS for a VM.
Set no minimum and no maximum IOPS for a VM.

The flexibility represented by the above options may result in a heterogeneous QoS configuration in the system, which can be hard to handle. In various embodiments, storage system resources are allocated so as to ensure that VMs that do not have any minimum IOPS setting do not starve of resources.

In some embodiments, the above goal of not starving VMs of resources is met by carving out system resources into a plurality of categories, as in the example shown in the below table:

| Category | VMs with no minimum IOPS | VMs with minimum IOPS | Internal File System VM with minimum | VM-less Files with minimum IOPS |
|---|---|---|---|---|
| Resource allocation | 20% | 50% | 20% | 10% |

Figure 13:
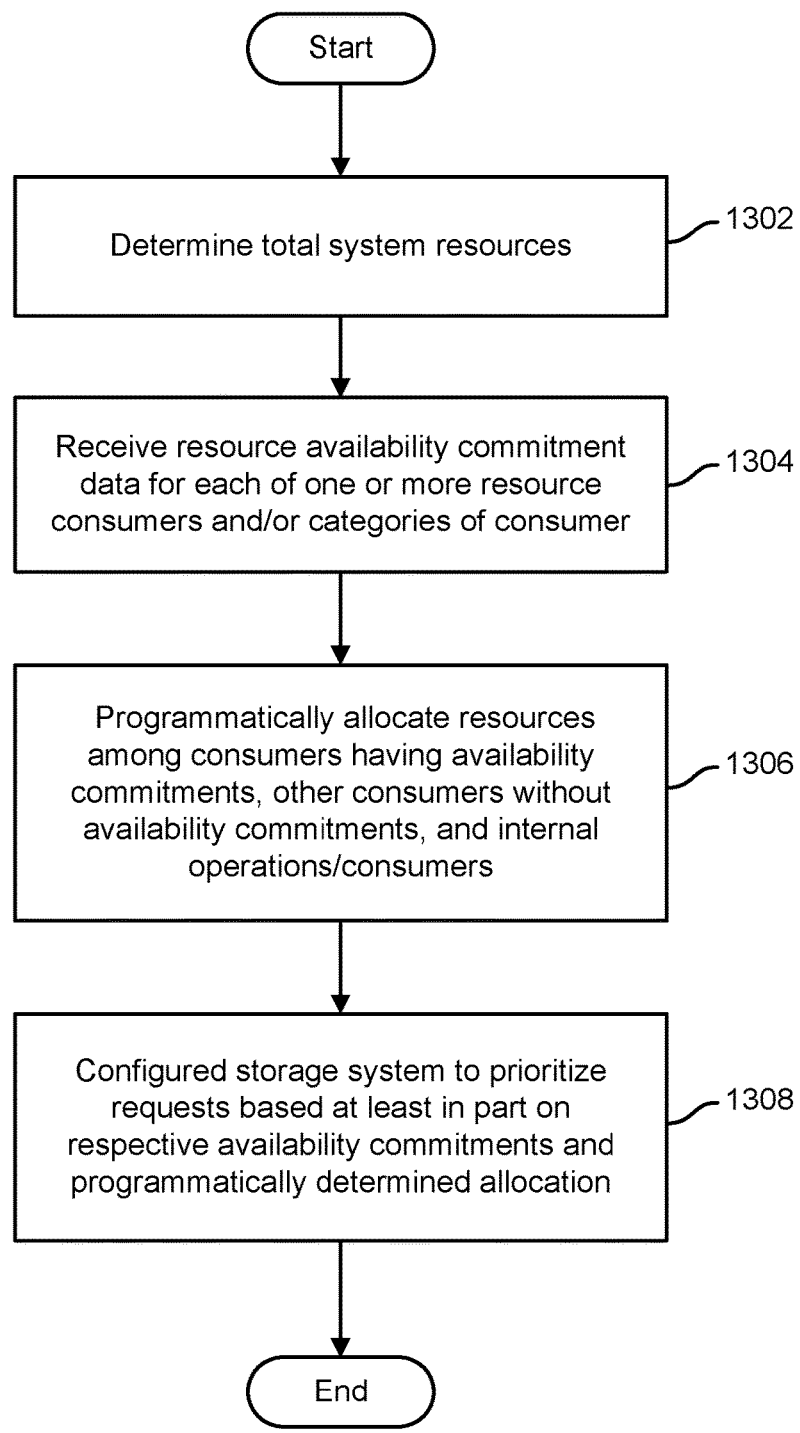
FIG. 13 is a flow chart illustrating an embodiment of a process to allocate storage system resources programmatically based on available resources and the respective QoS parameters associated with different classes of storage system resource consumer.

FIG. 13 is a flow chart illustrating an embodiment of a process to allocate storage system resources programmatically based on available resources and the respective QoS parameters associated with different classes of storage system resource consumer. In various embodiments, the process of FIG. 13 may be used to determine programmatically an allocation of storage system resources, such as in the table above. In the example shown, total system resources are determined (1302). For example, a maximum normalized IOPS the storage system may be able to handle without material performance degradation may be determined. Storage system capacity may be expressed in terms of normalized IOPS, throughput (e.g., kilobytes), and/or more abstract representations of capacity, such a determined number of tokens (or "shares", as in the example shown in FIG. 6) representing total capacity and being considered available to be allocated to various categories of consumer. Resource availability data (e.g., minimum IOPS and/or other QoS commitments) is received for resource consumers in each of one or more categories of consumer (1304). For example, in the example shown in the table above, the respective minimum IOPS guarantees associated with the VMs in the "VM with minimum IOPS" category may be received. Storage system resources are allocated programmatically among categories of consumer, including those having QoS commitments, such as minimum IOPS, those that do not have such commitments (e.g., VMs with no minimum IOPS), and other consumers, such as internal file system operations (1306). In some embodiments, the allocation may be determined by starting with a baseline or default value and adjusting the value, if indicated, based on the numbers of resource consumers in each category and the information known about them, such as the respective minimum IOPS commitments. For example, referring to the table above, the baseline/default allocation to VMs with minimum IOPS may have been 40%, but the number may have been adjusted upward to 50% based on one or both of the specific minimum IOPS commitments that had been indicated to have been made with respect to VMs in the "VMs with minimum IOPS" category and the number of consumers in other categories.

Referring further to FIG. 13, once the allocation is determined, the storage system is configured to prioritize requests from respective consumers in a manner that is determined based at least in part on the respective availability commitments indicated to have been made with individual resource consumers (e.g., minimum IOPS for that specific VM) and the programmatically determined allocation (e.g., percentage or otherwise indicated proportion of resources that have been allocated for use by VMs with minimum IOPS).

In various embodiments, storage system resource allocations may be applied flexibly, e.g., to allow consumers from one category to use resources that have been allocated to another category, such as during periods in which consumers from the other category are not requesting resources at or near the levels that have been allocated to them. In some embodiments, resource consumers from one category may be allowed to use resources allocated to another category, e.g., to handle short term surges or spikes in demand.

Figure 14:
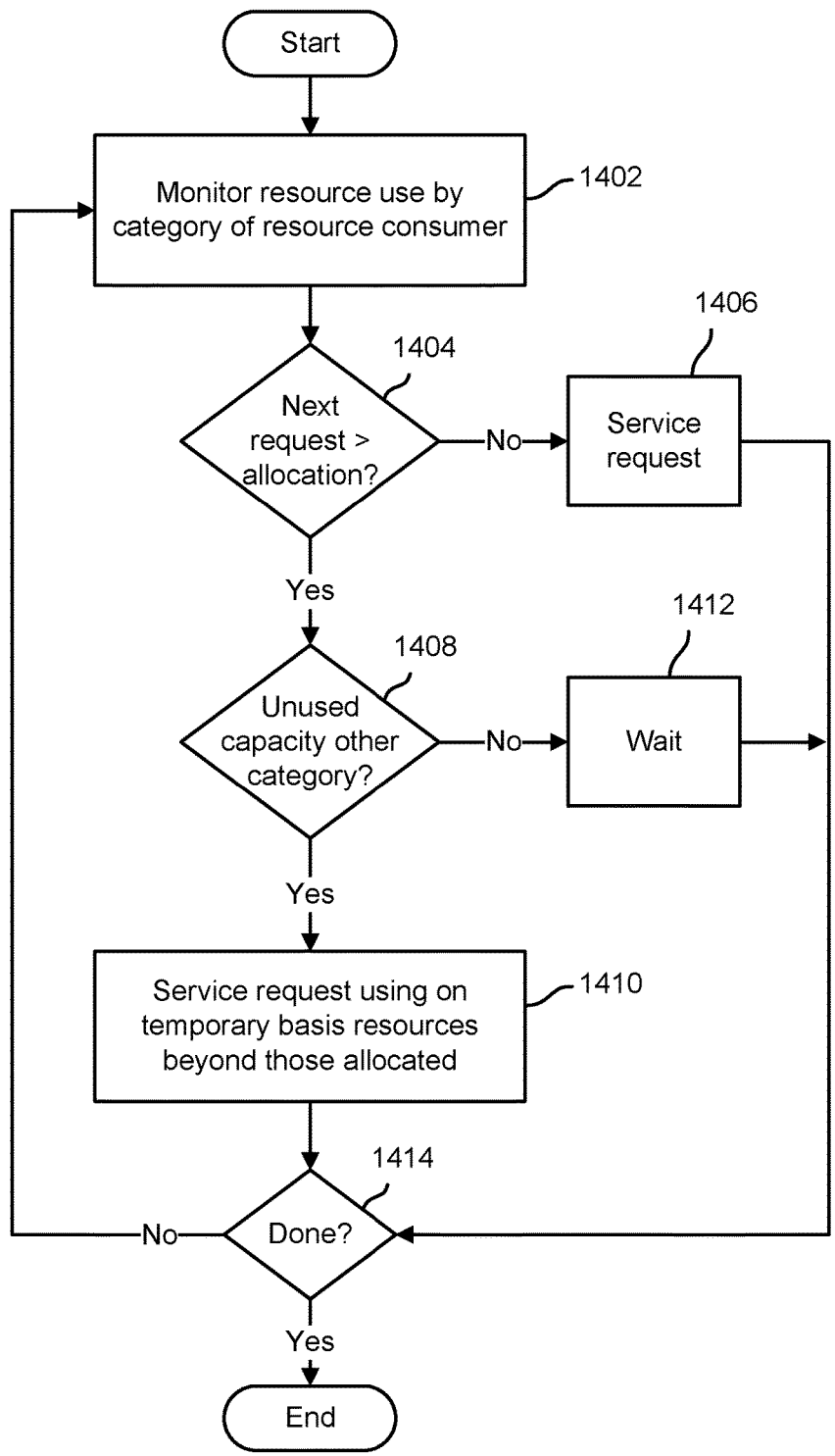
FIG. 14 is a flow chart illustrating an embodiment of a process to enforce storage system resource allocation flexibly.

FIG. 14 is a flow chart illustrating an embodiment of a process to enforce storage system resource allocation flexibly. In the example shown, storage system resource usage by each respective category of resource consumer is monitored (1402). If within a given category of consumer a next request to be serviced from a consumer (e.g., a VM) in that category would not result in resource usage beyond the resources allocated for use by consumers in that category of consumer (1404), the request is serviced (1406). If within a category the next request to be serviced would result in the allocation being exceed (1404), a check is performed to determine whether there is any unused capacity associated with any other category of user (1408). If consumers within such another category are not fully using the resources that have been allocated to that category (1408), the request form a consumer in the former category may be serviced, essentially allowing the consumer from the former category to use on a temporary basis resources that were allocated to be used by consumers in the latter category but which are not currently being used by such consumers. If the resources allocated to a category are fully used (1404) and there is not unused capacity allocated to other categories (1408), then the request must wait to be serviced (1412, 1414). In some embodiments, unused capacity allocated to one category may be used to service requests from consumers in another category only up to some limit, such as 50% of the currently unused capacity, to ensure resources will be available to service requests within the other category, e.g., if requests in that category should suddenly increase.

In various embodiments, allocating resources as disclosed herein and then enforcing such allocations flexibly as disclosed herein may enable storage system resources to be utilized to maximum benefit while ensuring that no category of resource consumer is starved of resources.

Figure 15:
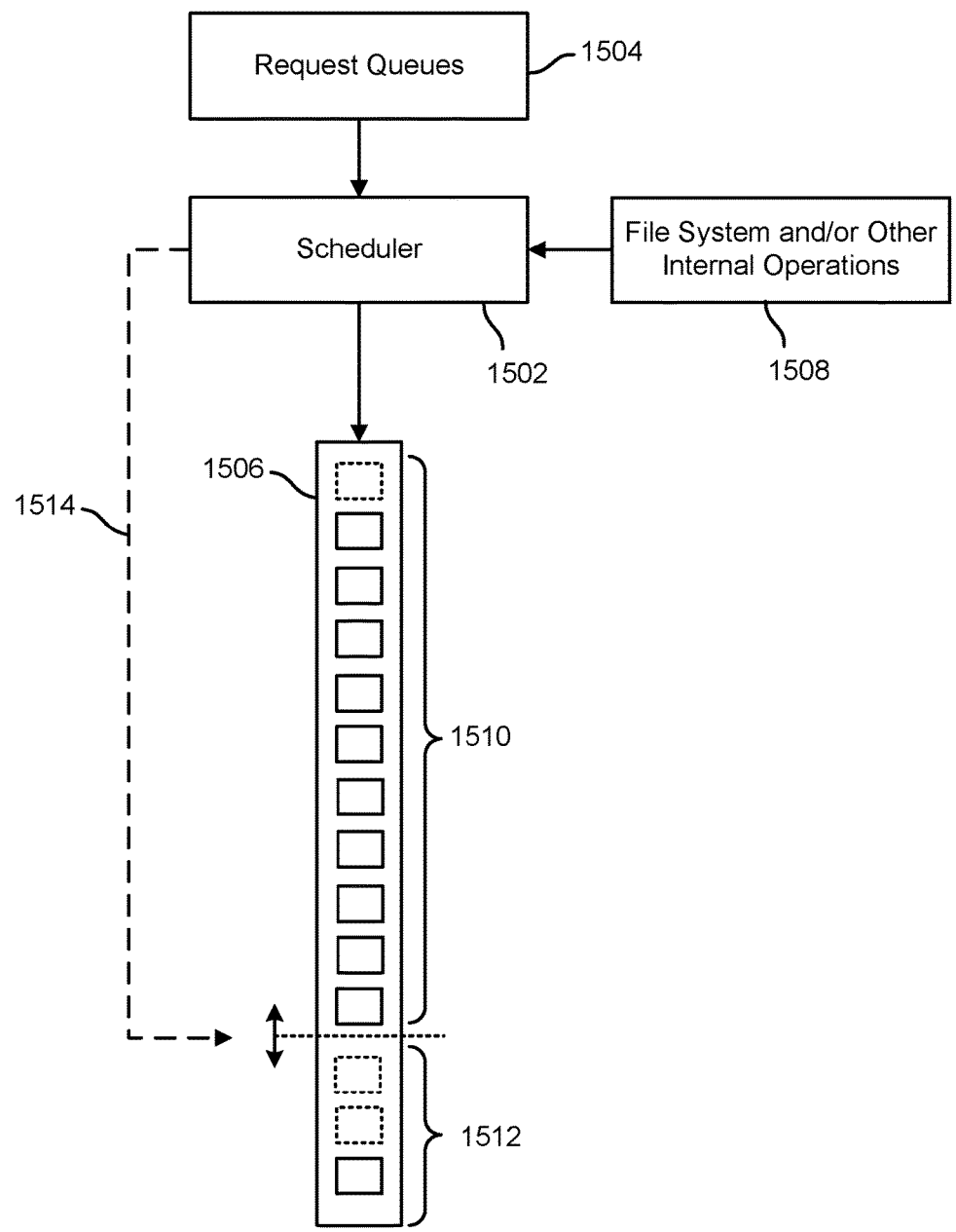
FIG. 15 is a block diagram illustrating an embodiment of a storage system scheduler configured to enforce storage system resource allocation.

FIG. 15 is a block diagram illustrating an embodiment of a storage system scheduler configured to enforce storage system resource allocation. In the example shown, scheduler 1502 is configured to schedule requests in request queues 1504, e.g., VM-specific read request queues and/or write request queues, as described above, to be added to a corresponding request pipeline 1506. In addition, in this example, scheduler 1502 is configured to regulate access to storage system resources by internal consumers, such as file system and/or other internal operations 1508. In some embodiments, the file system requests resources from the scheduler 1502 prior to performing internal file system operations. In the example shown, external consumer (e.g., VM) request (e.g., read, write) pipeline 1506 has a current size 1510 reflecting a current state of dynamic resource allocation in the storage system. For example, at any given time, the size 1510 may be determined based on one or more of the overall resources of the storage system; the size, current depth, number, and/or performance commitments associated with the request queues 1504; and the extent of current utilization by other categories of consumer, such as internal consumer, of the resources allocated for use by such categories. For example, in the example shown a portion 1512 of storage system resources have been allocated for use by internal operations 1508, but a significant proportion of those resources are not being used in the example shown (as indicated by the available slots shown as rectangles with dashed lines). In various embodiments, if the external request pipeline 1506 became full, resources allocated to internal operations 1508 but not currently being used for such operations may be released dynamically for temporary use to service additional requests from external users (e.g., VMs), effectively increasing temporarily (as indicated by arrow 1514) the size 1510 of the external request pipeline 1506. In some embodiments, if requests for resources to perform internal operations were to increase, the scheduler may pare down the size of the external request pipeline 1506, e.g., by not adding additional requests as requests in the pipeline are serviced, to make up to the allocated level of resources available for use by such internal operations.

In various embodiments, techniques disclosed herein may be used to provide one or more of quality of service guarantees and/or limitations on a per-VM basis, enforced natively by a VM-aware storage system; more accurate and intuitive performance statistics, reports, and/or visualizations, on a per-VM basis across VMs having dissimilar attributes, such as different request sizes; allowing access to storage system resources, in some embodiments flexibly, based at least in part on an allocation of resources among heterogeneous categories of resource consumers; and determining such allocations programmatically.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
   a memory configured to store for each of a plurality of virtual machines a corresponding virtual machine-specific input/output (I/O) request queue; and
   a processor coupled to the memory and configured to:
   receive at the storage system from a hypervisor a request to create a file;
   in response to the request to create the file,
   determine at the storage system a virtual machine associated with the file;
   store in a data structure stored at the storage system data representing the determined association between the file and the virtual machine, wherein the file is included in a plurality of files stored at the storage system and each file comprising at least a subset of the files in the plurality of files is associated with a corresponding virtual machine with which that file is associated, and wherein the data structure includes for at least each file in the subset data associating that file with the corresponding virtual machine with which that file is associated;
   receive requests, each request being associated with a corresponding file identified in the request;
   for each request, use the corresponding file identified in the request and data stored in the data structure to identify the corresponding virtual machine with which the request is associated and place the request in the virtual machine-specific I/O request queue corresponding to the corresponding virtual machine with which the request is associated; and
   schedule the requests to be pulled from the virtual machine-specific I/O request queues and added to a corresponding storage operation pipeline in an order determined based at least in part on a per virtual machine quality of service parameter.

2. The storage system of claim 1, wherein the processor is further configured to map each received request to a corresponding one of said input/output (I/O) request queues.

3. The storage system of claim 2, wherein the processor is configured to map each received request to a corresponding one of said input/output (I/O) request queues at least in part by the use of the corresponding file to identify a virtual machine with which the request is associated, and the use of the corresponding file includes extracting from the request a file identifier with which the request is associated and mapping the file identifier to a virtual machine with which the file identifier is associated.

4. The storage system of claim 2, wherein said requests are received from one or more hypervisors.

5. The storage system of claim 1, wherein the processor is configured to determine said order based at least in part on an automatically determined fair sharing of resources among a plurality of virtual machines.

6. The storage system of claim 1, wherein the processor is configured to determine said order based at least in part on respective request sizes associated with requests in different request queues.

7. The storage system of claim 1, wherein for at least a subset of said plurality of virtual machines said per virtual machine quality of service parameter comprises a minimum share of IOPS capacity.

8. The storage system of claim 7, wherein the processor is configured to determine said order based at least in part on said minimum share and request size.

9. The storage system of claim 1, wherein for at least a subset of said plurality of virtual machines said per virtual machine quality of service parameter comprises a maximum IOPS setting.

10. The storage system of claim 1, wherein said processor is further configured to track and report a normalized IOPS metric determined at least in part by comparing an actual request size to a reference request size.

11. The storage system of claim 1, wherein said processor is further configured to track and report a contention latency on a per virtual machine basis.

12. The storage system of claim 1, wherein said processor is configured to enforce a maximum IOPS setting and to track a report an associated throttle latency.

13. The storage system of claim 1, wherein the processor is configured to schedule requests based at least in part on a model of storage system performance capacity.

14. The storage system of claim 13, wherein said model comprises a storage system operation-specific model.

15. The storage system of claim 1, wherein the storage operation pipeline comprises a frontend write request pipeline and wherein the processor is configured to schedule requests based at least in part on a current state of an associated backend write pipeline.

16. The system of claim 1, wherein the determination of the association is based at least in part on a hypervisor type.

17. The system of claim 1, wherein the scheduling the requests includes adding a number of requests from a first queue and a number of requests from a second queue to the storage operation pipeline, the number of requests of the first queue and the number of requests from the second queue being selected based at least in part on a quality of service parameter for a respective virtual machine, the storage operation pipeline includes a first portion allocated to service requests from the first queue and a second portion allocated to service requests from the second queue, and in response to the first portion becoming full, dynamically releasing resources allocated to the second portion for temporary use to service requests associated with the first queue.

18. A method, comprising:

storing on a storage system, for each of a plurality of virtual machines, a corresponding virtual machine-specific input/output (I/O) request queue;

receiving at the storage system from a hypervisor a request to create a file;

in response to the request to create the file, determining at the storage system a virtual machine associated with the file;

storing in a data structure stored at the storage system data representing the determined association between the file and the virtual machine, wherein the file is included in a plurality of files stored at the storage system and each file comprising at least a subset of the files in the plurality of files is associated with a corresponding virtual machine with which that file is associated, and wherein the data structure includes for at least each file in the subset data associating that file with the corresponding virtual machine with which that file is associated;

receiving requests, each request being associated with a corresponding file identified in the request;

for each request, using the corresponding file identified in the request and data stored in the data structure to identify the corresponding virtual machine with which the request is associated and placing the request in the virtual machine-specific I/O request queue corresponding to the corresponding virtual machine with which the request is associated; and scheduling the requests to be pulled from the virtual machine-specific I/O request queues and added to a corresponding storage operation pipeline at the storage system in an order determined based at least in part on a per virtual machine quality of service parameter.

19. The method of claim 18, further comprising mapping each received request to a corresponding one of said input/output (I/O) request queues.

20. The method of claim 19, wherein each received request is mapped to a corresponding one of said input/output (I/O) request queues at least in part by the use of the corresponding file to identify a virtual machine with which the request is associated, and the use of the corresponding file includes extracting from the request a file identifier with which the request is associated and mapping the file identifier to a virtual machine with which the file identifier is associated.

21. The method of claim 18, wherein the order is determined based at least in part on an automatically determined fair sharing of resources among a plurality of virtual machines.

22. A computer program product embodied in a non-transitory computer readable storage medium and comprising computer instructions for:

storing on a storage system, for each of a plurality of virtual machines, a corresponding virtual machine-specific input/output (I/O) request queue;

receiving at the storage system from a hypervisor a request to create a file;

in response to the request to create the file, determining at the storage system a virtual machine associated with the file;

storing in a data structure stored at the storage system data representing the determined association between the file and the virtual machine, wherein the file is included in a plurality of files stored at the storage system and each file comprising at least a subset of the files in the plurality of files is associated with a corresponding virtual machine with which that file is associated, and wherein the data structure includes for at least each file in the subset data associating that file with the corresponding virtual machine with which that file is associated;

receiving requests, each request being associated with a corresponding file identified in the request;

for each request, using the corresponding file identified in the request and data stored in the data structure to identify the corresponding virtual machine with which the request is associated and placing the request in the virtual machine-specific I/O request queue corresponding to the corresponding virtual machine with which the request is associated; and scheduling the requests to be pulled from the virtual machine-specific I/O request queues and added to a corresponding storage operation pipeline at the storage system in an order determined based at least in part on a per virtual machine quality of service parameter.

* * * * *